(12) United States Patent
Evans et al.

(10) Patent No.: US 10,267,546 B2
(45) Date of Patent: Apr. 23, 2019

(54) VEHICLE HVAC SYSTEM WITH COMBINATION HEAT EXCHANGER FOR HEATING AND COOLING VEHICLE INTERIOR

(71) Applicant: FORD GLOBAL TECHNOLOGIES, LLC, Dearborn, MI (US)

(72) Inventors: Timmy Van Evans, Ypsilanti, MI (US); Manfred Koberstein, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 361 days.

(21) Appl. No.: 14/845,461

(22) Filed: Sep. 4, 2015

(65) Prior Publication Data

US 2017/0067671 A1    Mar. 9, 2017

(51) Int. Cl.
| | |
|---|---|
| *B60H 1/00* | (2006.01) |
| *B60H 3/00* | (2006.01) |
| *F25B 25/00* | (2006.01) |
| *B60H 1/32* | (2006.01) |
| *F25B 9/00* | (2006.01) |
| *F25B 41/06* | (2006.01) |

(52) U.S. Cl.
CPC ....... *F25B 25/005* (2013.01); *B60H 1/00328* (2013.01); *B60H 1/00492* (2013.01); *B60H 1/00885* (2013.01); *B60H 1/323* (2013.01); *F25B 9/008* (2013.01); *F25B 41/062* (2013.01); *F25B 2341/065* (2013.01)

(58) Field of Classification Search
CPC ............ B60H 1/00328; B60H 1/00321; B60H 1/00357; B60H 1/00885; B60H 1/323; B60H 1/00342; B60H 1/08; B60H 2001/002; B60H 1/00064; B60H 1/00492; B60H 2001/00928
USPC .............................................. 165/41, 42, 202
See application file for complete search history.

(56) References Cited

U.S. PATENT DOCUMENTS

| | | | | |
|---|---|---|---|---|
| 6,722,147 | B2 | 4/2004 | Heyl et al. | |
| 7,028,915 | B2* | 4/2006 | Uzkan | F01P 7/165 165/41 |
| 7,448,227 | B2* | 11/2008 | Zeigler | B60H 1/00378 123/41.19 |
| 7,707,845 | B2* | 5/2010 | Bilodeau | B60H 1/00378 165/42 |

(Continued)

*Primary Examiner* — Jason N Thompson
(74) *Attorney, Agent, or Firm* — Vichit Chea; King & Schickli PLLC

(57) ABSTRACT

A vehicle having a heating, ventilation and air conditioning (HVAC) system for heating and cooling a passenger compartment is provided. The vehicle may be described as including a $CO_2$ loop positioned within an engine compartment, a coolant loop positioned at least partially within the passenger compartment, a first heat exchanger positioned within the engine compartment for transferring heat from a coolant within the coolant loop to a $CO_2$ within the $CO_2$ loop, a pump for moving the coolant within the coolant loop, a second heat exchanger within the coolant loop for heating or cooling an air temperature within the passenger compartment, and first and second valves for controlling movement of the coolant through the second heat exchanger and a heated coolant loop.

8 Claims, 1 Drawing Sheet

(56) References Cited

U.S. PATENT DOCUMENTS

| | | | |
|---|---|---|---|
| 8,051,906 B2* | 11/2011 | Wolfe, IV | B60H 1/00321 165/101 |
| 8,516,841 B2 | 8/2013 | Wittmann et al. | |
| 8,517,087 B2 | 8/2013 | Zeigler et al. | |
| 2002/0014330 A1* | 2/2002 | Guyonvarch | B60H 1/00007 165/202 |
| 2004/0050089 A1* | 3/2004 | Amaral | B60H 1/00464 62/324.1 |
| 2005/0066679 A1* | 3/2005 | Boyer | B60H 1/00378 62/244 |
| 2008/0196877 A1* | 8/2008 | Zeigler | B60H 1/00907 165/202 |
| 2008/0245503 A1* | 10/2008 | Wilson | B60H 1/00371 165/42 |
| 2008/0251235 A1* | 10/2008 | Zhou | B60H 1/00278 165/41 |
| 2009/0249807 A1* | 10/2009 | Nemesh | B60H 1/00278 62/117 |
| 2009/0293525 A1* | 12/2009 | Monforte | B60H 1/00021 62/244 |
| 2011/0146942 A1 | 6/2011 | Wittmann | |
| 2012/0247715 A1* | 10/2012 | Renner | B60H 1/00385 165/42 |
| 2012/0297805 A1* | 11/2012 | Kamada | B60H 1/00278 62/208 |

\* cited by examiner

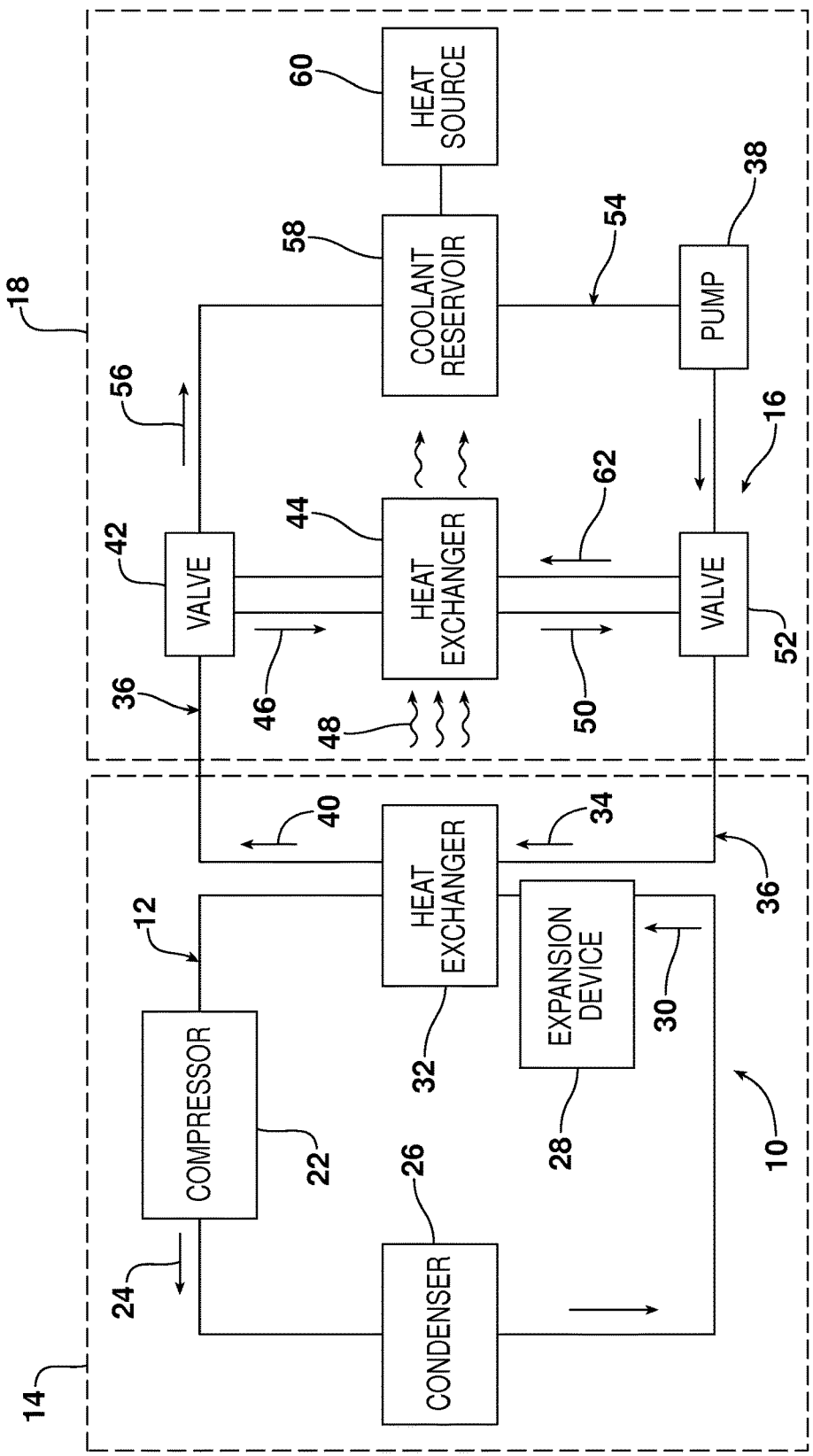

VEHICLE HVAC SYSTEM WITH COMBINATION HEAT EXCHANGER FOR HEATING AND COOLING VEHICLE INTERIOR

TECHNICAL FIELD

This document relates generally to vehicle heating/cooling systems, and more specifically to a vehicle heating, ventilating, and air conditioning system with a combination heat exchanger for heating and cooling a vehicle interior.

BACKGROUND

It is well known to utilize auxiliary heating, ventilating, and air conditioning (HVAC) systems in vehicles. Such systems can include $CO_2$ loops therein which operate at high pressures. When even partially positioned within the passenger compartment of a vehicle, additional care must be taken to protect vehicle occupants from failures associated with the high pressure systems. The resulting release of $CO_2$ in the passenger compartment could result in a displacement of oxygen in a short period of time. Accordingly, a need exists to eliminate the need for additional care and the concerns associated with such systems.

This can be accomplished by moving the $CO_2$ loop(s) entirely out of the passenger compartment of the vehicle. A lower pressure coolant loop could be used within the passenger compartment. A combination heat exchanger within the coolant loop could be utilized in association with a heat source to provide cooling and heating within the passenger compartment.

SUMMARY OF THE INVENTION

In accordance with the purposes and benefits described herein, a vehicle having a heating, ventilation and air conditioning (HVAC) system for heating and cooling a passenger compartment is provided. The vehicle may be broadly described as including a $CO_2$ loop positioned within an engine compartment, a coolant loop positioned at least partially within the passenger compartment, a first heat exchanger positioned within the engine compartment for transferring heat from a coolant within the coolant loop to a $CO_2$ within the $CO_2$ loop, a pump for moving the coolant within the coolant loop, a second heat exchanger within the coolant loop for heating or cooling an air temperature within the passenger compartment, and first and second valves for controlling movement of the coolant through the second heat exchanger and a heated coolant loop.

In another possible embodiment, the heated coolant loop includes a heat source for warming coolant within a coolant reservoir.

In still another possible embodiment, the second heat exchanger is a coolant to air heat exchanger. In yet another, the second heat exchanger is utilized in a heating mode to warm the air temperature within the passenger compartment. In another possible embodiment, the second heat exchanger is utilized in a cooling mode to cool the air temperature within the passenger compartment.

In yet still another possible embodiment, the heated coolant loop includes a heat source for warming coolant within a coolant reservoir.

In another possible embodiment, a first amount of coolant, controlled by the first valve, moving through the second heat exchanger from the first heat exchanger, and a second amount of coolant, controlled by the second valve, moving through the second heat exchanger from the heated coolant loop, at least partially determine the air temperature within the passenger compartment.

In yet another possible embodiment, an electric expansion device is utilized to control an amount and a temperature of the $CO_2$ entering the first heat exchanger.

In one other possible embodiment, the first valve directs a first portion of the coolant flowing from the first heat exchanger through the second heat exchanger and a second portion of the coolant flowing from the first heat exchanger through the coolant reservoir, and the second valve allows the first and second portions of the coolant to flow from the second heat exchanger and the coolant reservoir back to the first heat exchanger in a cooling mode.

In another possible embodiment, the first valve directs the coolant flowing from the first heat exchanger through the coolant reservoir, and the second valve allows a first portion of the coolant to flow from the coolant reservoir back to the first heat exchanger and a second portion of the coolant to flow through the second heat exchanger back to the first valve in a heating mode.

In yet another possible embodiment, a first valve directs a first portion of the coolant flowing from the first heat exchanger through the second heat exchanger and a second portion of the coolant flowing from the first heat exchanger through the coolant reservoir, and the second valve allows the first portion of the coolant to flow from the second heat exchanger back to the first heat exchanger and at least a third portion of the second portion of the coolant to flow from the coolant reservoir through the second heat exchanger.

In another possible embodiment, a vehicle having a heating, ventilation and air conditioning (HVAC) system for heating and cooling a passenger compartment, includes a $CO_2$ loop positioned within an engine compartment, a coolant loop including a pump for circulating a coolant within the coolant loop, a first heat exchanger for transferring heat from the coolant to a $CO_2$, moving within the $CO_2$ loop, to supercool the coolant, a second heat exchanger within the coolant loop for changing an air temperature within the passenger compartment, a first valve within the coolant loop for controlling a flow of the supercooled coolant, from the first heat exchanger, through the second heat exchanger and a heated coolant loop, and a second valve within the coolant loop for controlling a flow of coolant, from the heated coolant loop, through the second heat exchanger and the first heat exchanger.

In still another possible embodiment, the heated coolant loop includes a reservoir and a heat source for heating the coolant flowing through the reservoir.

In yet still another possible embodiment, the second heat exchanger is a coolant to air heat exchanger.

In one other possible embodiment, the first valve directs all of the flow of the supercooled coolant, from the first heat exchanger, through the second heat exchanger in a cooling mode to cool the air temperature within the passenger compartment.

In another possible embodiment, the first valve directs at least a portion of the flow of the supercooled coolant, from the first heat exchanger, through the heated coolant loop and the second valve directs at least a portion of the flow of the coolant, from the heated coolant loop, through the second heat exchanger in a heating mode to heat the air temperature within the passenger compartment. In another, the second heat exchanger and the reservoir are in parallel.

In accordance with the purposes and benefits described herein, a method is provided of controlling an air temperature within a passenger compartment of a vehicle having a coolant to air heat exchanger positioned within the passenger compartment. The method may be broadly described as comprising the steps of: (a) pumping a coolant through a coolant loop having a heated coolant reservoir in parallel with the coolant to air heat exchanger; (b) transferring heat from the coolant flowing within the coolant loop to a $CO_2$ flowing within a $CO_2$ loop, the $CO_2$ loop positioned within an engine compartment of the vehicle, for supercooling a portion of the coolant; (c) controlling the flow of coolant, including the supercooled portion of the coolant, through the heated coolant reservoir and the coolant to air heat exchanger; and (d) moving air through the coolant to air heat exchanger in order to change a temperature of air entering the passenger compartment.

In one possible embodiment, the controlling step includes directing the supercooled portion of the coolant through the coolant to air heat exchanger in a cooling mode. In another possible embodiment, the controlling step includes directing at least a portion of the supercooled portion of the coolant through the heated coolant reservoir and then through the coolant to air heat exchanger in a heating mode.

In the following description, there are shown and described several embodiments of a vehicle having a heating, ventilation and air conditioning (HVAC) system for heating and cooling a passenger compartment and a related method of controlling an air temperature within a passenger compartment of a vehicle having a coolant to air heat exchanger positioned within the passenger compartment. As it should be realized, the vehicle and related methods are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing FIGURES incorporated herein and forming a part of the specification, illustrate several aspects of the vehicle and methods and together with the description serve to explain certain principles thereof. In the drawing FIGURES:

FIG. 1 is a schematic diagram of a vehicle cooling and heating system including a $CO_2$ loop positioned within an engine compartment and a coolant loop positioned at least partially within a passenger compartment.

Reference will now be made in detail to the present preferred embodiments of the vehicle having a heating, ventilation and air conditioning (HVAC) system for heating and cooling a passenger compartment and the related method of controlling an air temperature within the passenger compartment, examples of which are illustrated in the accompanying drawing FIGURES, wherein like numerals are used to represent like elements.

DETAILED DESCRIPTION

Reference is now made to FIG. 1 illustrating a schematic diagram of a vehicle heating, ventilation and air conditioning (HVAC) system 10 including a high pressure $CO_2$ loop 12 positioned within an engine compartment 14 of a vehicle and a coolant loop 16 positioned at least partially within a passenger compartment 18 for heating and cooling the passenger compartment through vents (not shown) positioned therein. The $CO_2$ loop is entirely contained within the engine compartment.

In the described embodiment, the $CO_2$ loop 12 includes a compressor 22. In an A/C mode of operation of the system 10, the compressor 22 compresses a fluid, which is carbon dioxide ($CO_2$) gas in the described embodiment, thereby raising a pressure and a temperature (T) of the $CO_2$ gas. The high temperature, high pressure $CO_2$ gas exits the compressor 22, as shown by action arrow 24, and flows into a condenser 26.

Broadly speaking, the condenser 26 is positioned at a front section of an engine compartment, in the described embodiment, and functions to cool the $CO_2$ gas. Within the condenser 26, the high temperature, high pressure $CO_2$ gas is condensed due primarily to the dissipation of heat to outside air, and liquefied. Although not shown, a fan may be utilized to create and regulate the flow of air over the condenser.

The high pressure, liquefied $CO_2$ then flows to an expansion or metering device 28 as shown by action arrow 30. Regulation of the flow of the high pressure, liquefied $CO_2$ through the expansion device 28, or throttling, is used to control a temperature of the $CO_2$ entering a first heat exchanger 32 which is a $CO_2$ to coolant heat exchanger. Increasing the flow of the $CO_2$ necessarily lowers the temperature of the $CO_2$ entering the first heat exchanger 32.

In the described embodiment, the expansion device 28 is an electric expansion device utilized to control an amount and a temperature of the $CO_2$ entering a first heat exchanger 32. The electric expansion device 28 is electrically connected to a control module (not shown) of the vehicle which controls the device in response to input from at least the vehicle occupants. In alternate embodiments, the expansion device 28 could be a fixed orifice tube with an associated bypass device. In a bypass mode, for example in the heating mode, the control module determines that the expansion device allow the high pressure, liquefied $CO_2$ to pass through the device without a drop in pressure. In other words, the expansion device has substantially no effect on the $CO_2$ in the bypass mode.

In a non-bypass mode, for example in the cooling mode, the liquid $CO_2$ flowing through the $CO_2$ loop 12 is expanded in the electric expansion device 28 and becomes a low-temperature, low-pressure liquid and vapor $CO_2$ mixture. This low-temperature, low-pressure liquid and vapor $CO_2$ mixture is supplied to the first heat exchanger 32. While flowing through the first heat exchanger 32 in the cooling mode, the low-temperature, low-pressure liquid and vapor $CO_2$ mixture absorbs heat from a coolant that is pumped by a pump 38 through a coolant loop 36 as shown by action arrow 34.

Although the $CO_2$ loop is positioned within the engine compartment, the $CO_2$ loop is in thermal communication with the coolant loop 36 which circulates coolant within the passenger compartment. More specifically, the first heat exchanger 32 is a plate to plate $CO_2$ to coolant aluminum heat exchanger which transfers heat between alternating $CO_2$ and coolant plates primarily via conduction. In other words, heat is drawn from the coolant loop 16 into the $CO_2$ loop 12.

Due to the absorption of heat from the coolant within the first heat exchanger 32, the low-temperature, low-pressure liquid and vapor $CO_2$ mixture undergoes a phase change by boiling into an intermediate-temperature, intermediate-pressure vapor before re-entering the compressor 22 where it is again compressed and cycled through the $CO_2$ loop 12. At the same time, the coolant flowing through the first heat exchanger 32 is supercooled, in the described embodiment, to temperatures between −20 and −30 degrees Celsius. The supercooled portion of the coolant, shown by action arrow 40, flows from the first heat exchanger 32 to a first valve 42.

In the cooling mode, the first valve 42 directs all of the supercooled coolant to a second heat exchanger 44, as shown by action arrow 46, in the described embodiment. In an alternate embodiment, the first valve 42 may direct a first portion of the coolant flowing from the first heat exchanger 32 through the second heat exchanger 44 and a second portion of the coolant flowing from the first heat exchanger 32 through a heated coolant loop 54. Even more, a second valve 52 may allow the first and second portions of the coolant to flow from the second heat exchanger 44 and the heated coolant loop 54 back to the first heat exchanger 32. In this alternate embodiment, a heat source 60 for heating coolant within a coolant reservoir 58 would be in an "OFF" state and would circulate coolant through the coolant reservoir 58 without effecting the temperature of air within the passenger compartment 18. This may be done for the purpose of de-gassing the coolant or otherwise.

In the described embodiment, the second heat exchanger 44 is a coolant-to-air heat exchanger. While flowing through the second heat exchanger 44, the supercooled coolant absorbs latent heat from air that is circulated through the passenger compartment 18 as shown by arrows 48. The byproducts are a lowered temperature air and condensation from the air that is routed from the second heat exchanger 44 to an exterior of the vehicle. A blower (not shown) blows air across the second heat exchanger 44 and through one or more vents (not shown) to the passenger compartment 18. This process results in the passenger compartment 18 having a cooler, drier air therein.

Due to the absorption of heat from the air, the supercooled coolant is warmed before returning to the first heat exchanger 32. The second valve 52 directs the warmed coolant from the second heat exchanger 44, as shown by action arrow 50, back to the first heat exchanger 32 as shown by action arrow 34. In other words, the first valve 42 directs the coolant flowing from the first heat exchanger 32 through the second heat exchanger 44 and the second valve 52 allows the coolant to flow from the second heat exchanger 44 back to the first heat exchanger in the cooling mode.

The second heat exchanger, in the described embodiment, is sized for coolant and designed with a large, 92 mm core depth. The use of a low pressure coolant rather than a refrigerant allows for a thinner gauge metal to be used which provides for optimum heat transfer at a lower overall weight. The core depth of the second heat exchanger is larger than a standard evaporator core depth which is typically 38 mm. Although the size of the second heat exchanger is significantly larger than the standard evaporator, the second heat exchanger is still able to be packaged in a standard HVAC case. This is possible because the second heat exchanger provides both a cooling and a heating function eliminating the need for a heater core within the system. Thus, there is available space within the standard HVAC case.

In a heating mode, the compressor 22 is turned to an "OFF" state or may be placed in the bypass mode in alternate embodiments. In this scenario with the compressor "OFF," $CO_2$ ceases to flow within the $CO_2$ loop 12 and the coolant flowing through the first heat exchanger 32 is not supercooled through transfer of its heat to the $CO_2$. Nevertheless, pump 38 operates to pump coolant throughout the coolant loop 36. More specifically, coolant is pumped through the first heat exchanger 32 although with no significant effect on the temperature of the coolant passing therethrough. As shown by action arrow 40, the coolant leaves the first heat exchanger 32 and is directed by the first valve 42 through the second heat exchanger 44 (shown by action arrow 46) and through a heated coolant loop 54 (shown by action arrow 56).

The heated coolant loop 54 provides heat to the coolant at low pressure. In the described embodiment, the heated coolant loop 54 includes the coolant reservoir 58 and a heat source 60 for warming or heating the coolant within the coolant reservoir. The coolant reservoir 58 is in parallel with the second heat exchanger 44. In an alternate embodiment, the heated coolant loop 54 may further include a de-gasser (not shown).

The heated coolant is pumped from the coolant reservoir 58 by pump 38 to the second valve 52. In the heating mode in the described embodiment, the second valve 52 directs at least a portion of the heated coolant into the second heat exchanger 44 as shown by action arrow 62. While flowing through the second heat exchanger 44, the heated coolant dissipates heat to the air, shown by arrows 48, that is circulated through the passenger compartment 18. The result is a raised temperature air in the passenger compartment 18.

Due to the dissipation of heat, the coolant is cooled as it passes through the second heat exchanger 44. The first valve 42 again directs the cooled coolant back through the heated coolant loop 54 to the second valve 52. Again, the second valve 52 directs at least a portion of the heated coolant back to the second heat exchanger 44 and a remaining portion back to the first heat exchanger 32 as shown by action arrow 34. In other words, the first valve 42 directs the coolant flowing from the first heat exchanger 32 through the second heat exchanger 44 and the heated coolant loop 54, and the second valve 52 allows the coolant to flow through the second heat exchanger 44 back to the first heat exchanger and directs at least a portion of the heated coolant pumped from the coolant loop 54 through the second heat exchanger in the heating mode. The first valve 42 further directs the portion of the heated coolant directed back through the second heat exchanger 44 back through the coolant loop 54.

In an alternate embodiment, the first valve 42 may direct all of the coolant flowing from the first heat exchanger 32 through the coolant reservoir 58, and the second valve 52 may allow a first portion of the coolant flowing through the coolant reservoir to flow from the coolant reservoir back to the first heat exchanger and a second portion of the coolant flowing through the coolant reservoir to flow through the second heat exchanger 44 back to the first valve in the heating mode.

In another alternate embodiment, the first valve 42 may direct a first portion of the coolant flowing from the first heat exchanger 32 through the second heat exchanger 44 and a second portion of the coolant flowing from the first heat exchanger through the coolant reservoir 58. The second valve 52 may direct the first portion of the coolant flowing from the second heat exchanger back to the first heat exchanger and at least some of the second portion of the coolant to flow from the coolant reservoir through the second heat exchanger in the heating mode.

In yet another alternate embodiment, a first amount of coolant, controlled by the first valve 42, moving through the second heat exchanger 44 from the first heat exchanger 32, and a second amount of coolant, controlled by the second valve, moving through the second heat exchanger from the heated coolant loop 54, work together within the second heat exchanger to at least partially determine the air temperature within the passenger compartment 18. In other words, some coolant, possibly supercooled within the first heat exchanger 32 by operation of compressor 22, condenser 26, and expansion device 28, may be moved through the second heat exchanger 32 at the same time some coolant, warmed within the coolant reservoir 58, is moved through the second heat exchanger. With both cooled and warmed coolant moving within the second heat exchanger 32, the temperature of the air passing therethough can be warmed or cooled as desired. The first and second valves operate to control the amounts of supercooled coolant and warmed coolant passing through the second heat exchanger 32 which determines the temperature of the air in the passenger compartment.

In summary, numerous benefits result from the vehicle utilizing a heating, ventilating, and air conditioning system with a combination heat exchanger for heating and cooling a vehicle interior. Utilization of the combination heat exchanger within a coolant loop avoids the need for additional care and the concerns associated with the operation of $CO_2$ systems within the passenger compartment.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle having a heating, ventilation and air conditioning (HVAC) system for heating and cooling a passenger compartment, comprising:
   a $CO_2$ loop positioned within an engine compartment;
   a coolant loop positioned at least partially within the passenger compartment;
   a first heat exchanger positioned within said engine compartment for transferring heat from a coolant within said coolant loop to $CO_2$ within said $CO_2$ loop;
   a pump for moving said coolant within said coolant loop;
   a second heat exchanger within said coolant loop for changing an air temperature within the passenger compartment; and
   first and second valves for controlling movement of said coolant through said second heat exchanger and a heated coolant loop, wherein said first valve directs coolant flowing from said first heat exchanger through said coolant reservoir, and said second valve allows a first portion of the coolant directed through said coolant reservoir to flow from said coolant reservoir back to said first heat exchanger and a second portion of the coolant directed through said coolant reservoir to flow through said second heat exchanger back to said first valve in a heating mode.

2. The vehicle having an HVAC system for heating and cooling a passenger compartment of claim 1, wherein said second heat exchanger is a coolant to air heat exchanger.

3. The vehicle having an HVAC system for heating and cooling a passenger compartment of claim 2, wherein said second heat exchanger is utilized in a heating mode to warm the air temperature within the passenger compartment.

4. The vehicle having an HVAC system for heating and cooling a passenger compartment of claim 3, wherein said second heat exchanger is utilized in a cooling mode to cool the air temperature within the passenger compartment.

5. The vehicle having an HVAC system for heating and cooling a passenger compartment of claim 2, wherein a first amount of coolant, controlled by said first valve, moving through said second heat exchanger from said first heat exchanger, and a second amount of coolant, controlled by said second valve, moving through said second heat exchanger from said heated coolant loop, at least partially determine an air temperature within said passenger compartment.

6. The vehicle having an HVAC system for heating and cooling a passenger compartment of claim 2, wherein said first valve directs a first portion of coolant flowing from said first heat exchanger through said second heat exchanger and a second portion of coolant flowing from said first heat exchanger through said coolant reservoir, and said second valve allows the first and second portions of coolant to flow from said second heat exchanger and said coolant reservoir back to said first heat exchanger in a cooling mode.

7. The vehicle having an HVAC system for heating and cooling a passenger compartment of claim 2, wherein said first valve directs a first portion of coolant flowing from said first heat exchanger through said second heat exchanger and a second portion of coolant flowing from said first heat exchanger through said coolant reservoir, and said second valve allows the first portion of coolant to flow from said second heat exchanger back to said first heat exchanger and at least a third portion of the second portion of coolant to flow from said coolant reservoir through said second heat exchanger.

8. The vehicle having an HVAC system for heating and cooling a passenger compartment of claim 2, wherein said second heat exchanger and said reservoir are in parallel.

* * * * *